(12) United States Patent
Liu et al.

(10) Patent No.: US 7,993,180 B2
(45) Date of Patent: Aug. 9, 2011

(54) MANUFACTURING METHOD OF FIELD EMISSION ELEMENT HAVING CARBON NANOTUBES

(75) Inventors: Liang Liu, Beijing (CN); Kai-Li Jiang, Beijing (CN); Shou-Shan Fan, Beijing (CN); Caesar Chen, Santa Clara, CA (US); Hsi-Fu Lee, Taipei Hsien (TW); Ga-Lane Chen, Santa Clara, CA (US)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/615,280

(22) Filed: Nov. 10, 2009

(65) Prior Publication Data

US 2010/0056012 A1  Mar. 4, 2010

Related U.S. Application Data

(62) Division of application No. 11/766,996, filed on Jun. 22, 2007, now Pat. No. 7,781,950.

(30) Foreign Application Priority Data

Jun. 23, 2006 (CN) .......................... 2006 1 0061305

(51) Int. Cl.
*H01J 9/24* (2006.01)
(52) U.S. Cl. ........................................................ 445/24
(58) Field of Classification Search .................... 445/24; 313/311, 495–497
See application file for complete search history.

(56) References Cited

U.S. PATENT DOCUMENTS

| | | |
|---|---|---|
| 6,459,405 B1 | 10/2002 | Da et al. |
| 6,507,146 B2 * | 1/2003 | Moore ........................ 313/495 |
| 6,646,623 B1 | 11/2003 | Chakrabarti |
| 6,682,677 B2 | 1/2004 | Lobovsky et al. |
| 6,692,327 B1 | 2/2004 | Deguchi et al. |
| 6,858,981 B2 * | 2/2005 | Cho et al. ...................... 313/495 |
| 6,894,890 B2 | 5/2005 | Takatani et al. |
| 6,913,789 B2 * | 7/2005 | Smalley et al. ............ 427/249.1 |
| 7,728,505 B2 | 6/2010 | Liu et al. |
| 2001/0001681 A1 * | 5/2001 | Zhang et al. ................... 427/508 |
| 2002/0046872 A1 * | 4/2002 | Smalley et al. ............ 174/137 A |
| 2002/0074932 A1 | 6/2002 | Bouchard et al. |
| 2003/0083421 A1 | 5/2003 | Kumar et al. |
| 2004/0051432 A1 | 3/2004 | Jiang et al. |
| 2004/0118583 A1 | 6/2004 | Tonucci et al. |
| 2004/0150312 A1 | 8/2004 | McElrath et al. |
| 2004/0192153 A1 | 9/2004 | Liu et al. |
| 2005/0035701 A1 | 2/2005 | Choi et al. |
| 2005/0112051 A1 | 5/2005 | Liu et al. |

(Continued)

FOREIGN PATENT DOCUMENTS

CN      1410475      4/2003

(Continued)

OTHER PUBLICATIONS

Vigolo et al., Macroscopic Fibers and Ribbons of Oriented Carbon Natubes, Science, vol. 290, p. 1358-1361, Nov. 17, 2000.

(Continued)

*Primary Examiner* — Toan Ton
*Assistant Examiner* — Hana S Featherly
(74) *Attorney, Agent, or Firm* — Clifford O. Chi

(57) ABSTRACT

A method for manufacturing a field emission element, the method includes providing one supporting member and wrapping a carbon nanotube (CNT) film around an outer surface of the supporting member at least once. The CNT film includes a plurality of bundles of carbon nanotubes connected in series.

6 Claims, 3 Drawing Sheets

U.S. PATENT DOCUMENTS

| | | |
|---|---|---|
| 2005/0170177 A1 | 8/2005 | Crawford et al. |
| 2005/0228140 A1 | 10/2005 | Rajagopalan et al. |
| 2005/0239364 A1 | 10/2005 | Yang |
| 2006/0017370 A1 | 1/2006 | Wei et al. |
| 2006/0022568 A1 | 2/2006 | Kornilovich et al. |
| 2006/0091782 A1 | 5/2006 | Liu et al. |
| 2007/0228920 A1* | 10/2007 | Jiang et al. .................... 313/315 |
| 2008/0170982 A1 | 7/2008 | Zhang et al. |

FOREIGN PATENT DOCUMENTS

| | | |
|---|---|---|
| CN | 1674192 | 9/2005 |
| CN | 2731700 Y | 10/2005 |
| TW | I231513 | 4/2005 |
| TW | 200519036 | 6/2005 |
| TW | 200614859 | 5/2006 |
| WO | WO2005045871 | 5/2005 |

OTHER PUBLICATIONS

Taylor, G.F et al., A Method of Drawing Metallic Filaments and a Discussion of Their Properties and Uses, Physical Review vol. 23, 655-660, May 31, 1924.

Mei Zhang et al., Multifunctional Carbon Nanotube Yarns by Downsizing an Ancient Technology, Science, vol. 306, p. 1358-1361, Nov. 19, 2004.

* cited by examiner

MANUFACTURING METHOD OF FIELD EMISSION ELEMENT HAVING CARBON NANOTUBES

RELATED APPLICATION

This application is a divisional application of patent application Ser. No. 11/766,996 filed on Jun. 22, 2007, now U.S. Pat. No. 7,781,950, from which it claims the benefit of priority under 35 U.S.C. 120. The patent application Ser. No. 11/766,996 in turn claims the benefit of priority under 35 USC 119 from Chinese Patent Application 200610061305.9, filed on Jun. 23, 2006.

BACKGROUND

1. Technical Field

The invention relates to field emission elements and manufacturing methods thereof and, particularly, to a field emission element employing carbon nanotubes and a manufacturing method thereof.

2. Description of the Related Art

Carbon nanotubes (CNTs) produced by means of arc discharge between graphite rods were first discovered and reported in an article by Sumio Iijima, entitled "Helical Microtubules of Graphitic Carbon" (Nature, Vol. 354, Nov. 7, 1991, pp. 56-58). Carbon nanotubes are electrically conductive along their length, are chemically stable, and can each have a very small diameter (much less than 100 nanometers) and a large aspect ratio (length/diameter). Due to these and other properties, it has been suggested that carbon nanotubes can play an important role in fields such as microscopic electronics, field emission devices, thermal interface materials, etc.

Generally, a CNT field emission element includes a conductive cathode electrode and a carbon nanotube formed on the cathode electrode. The carbon nanotube acts as an emitter of the field emission element. The methods adopted for forming the carbon nanotube on the conductive cathode electrode mainly include mechanical methods and in-situ synthesis methods. One mechanical method is performed by using an atomic force microscope (AFM) to place a synthesized carbon nanotube on a conductive cathode electrode and to then fix the carbon nanotube on the conductive cathode electrode, via a conductive paste or adhesive. The mechanical method is relatively easy/straightforward. However, the precision and efficiency thereof are relatively low. Furthermore, the electrical connection between the conductive base and the carbon nanotube tends to be poor because of the limitations of the conductive adhesives/pastes used therebetween. Thus, the field emission characteristics of the carbon nanotube are generally unsatisfactory.

One in-situ synthesis method is performed by coating metal catalysts on a conductive cathode electrode and directly synthesizing a carbon nanotube on the conductive cathode electrode by means of chemical vapor deposition (CVD). The in-situ synthesis method is relatively easy. Furthermore, the electrical connection between the conductive base and the carbon nanotube is typically good because of the direct engagement therebetween. However, the mechanical bonding between the carbon nanotube and the conductive base often is relatively weak and thus unreliable. Thus, in use, such a carbon nanotube is apt, after a period of time, to break away (partially or even completely) from the conductive cathode electrode, due to the mechanical stress associated with the electric field force. Such breakage/fracture would damage the field emission electron source and/or decrease its performance. Furthermore, in the in-situ synthesis method, controlling of the growth direction of the carbon nanotube is difficult to achieve during the synthesis process. Thus, the production efficiency thereof can be relatively low, and the controllability thereof is often less than desired. Still furthermore, the in-situ synthesis method has a relatively high cost.

What is needed, therefore, is a field emission element that promotes a good mechanical and electrical connection between the carbon nanotube and the conductive cathode electrode and that, thus, tends to have satisfactory field emission characteristics.

What is also needed is a method for manufacturing the above-described field emission electron source, the method having a relatively low cost, relatively high production efficiency, and an improved controllability.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments.

Figure 1:
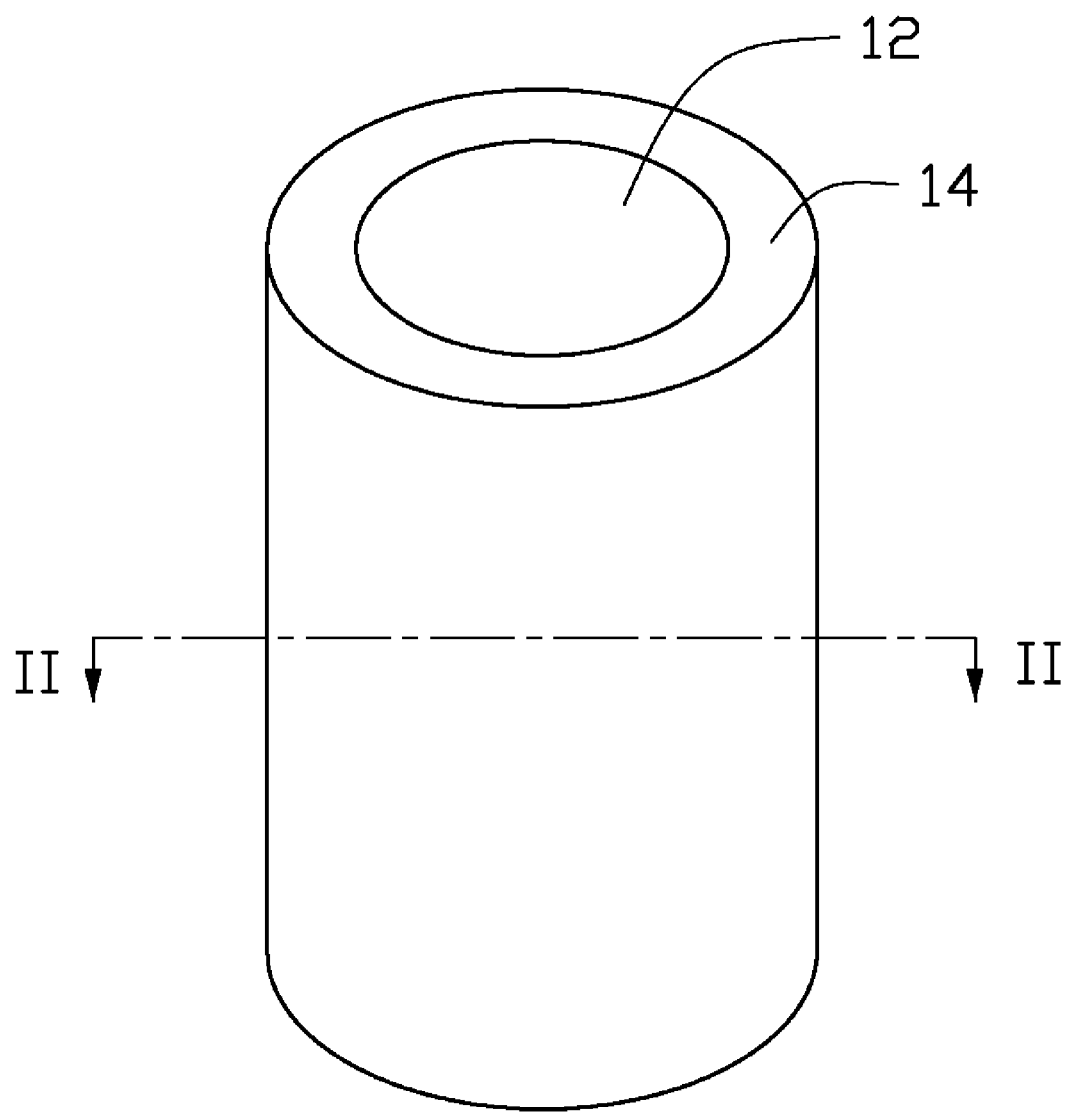
FIG. 1 is an isometric view of a field emission element, in accordance with an exemplary embodiment of the present device, the field emission element incorporating a CNT field emission layer.

Corresponding reference characters indicate corresponding parts throughout the several views. The exemplifications set out herein illustrate at least one preferred embodiment of the invention, in one form, and such exemplifications are not to be construed as limiting the scope of the invention in any manner.

DETAILED DESCRIPTION

Reference will now be made to the drawings to describe embodiments of the present field emission element and the related manufacturing method, in detail.

Figure 2:
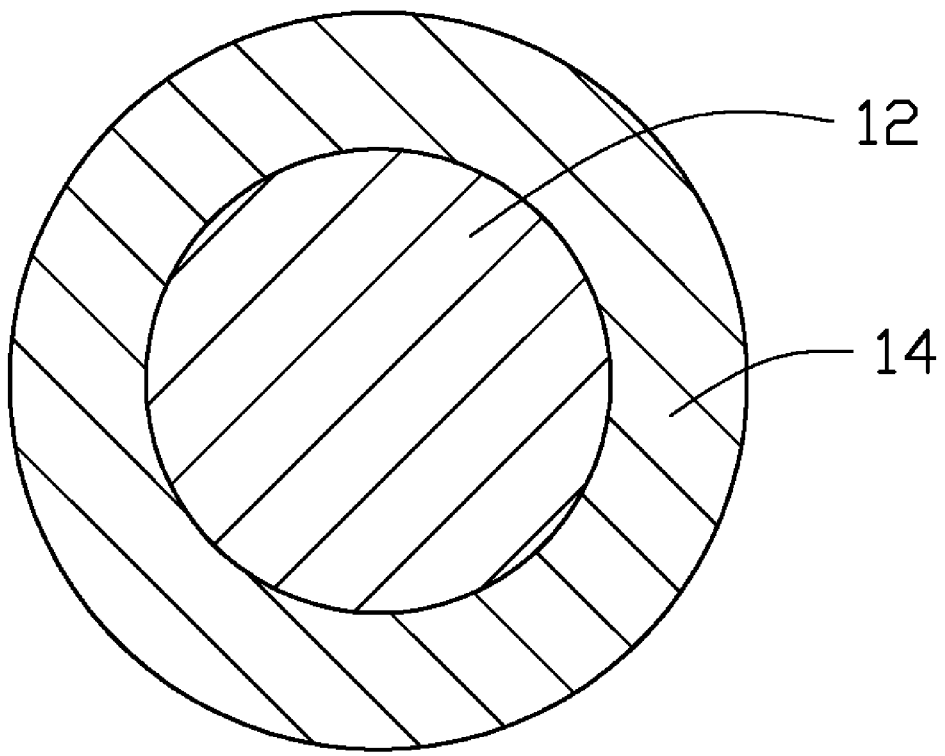
FIG. 2 is a longitudinal sectional view of the field emission element of FIG. 1, along line II-II.

FIG. 1 is an isometric view of a field emission element 10, in accordance with an exemplary embodiment of the present device, and FIG. 2 is a longitudinal sectional view of the upper portion of the field emission element 10 of FIG. 1. As shown in FIGS. 1 and 2, the field emission element 10 includes one supporting wire 12 and a field emission layer 14 coated or otherwise formed on/to an outer surface of the supporting wire 12. The field emission layer 14 is used for emitting electrons, and the supporting wire 12 is used for supporting and protecting the field emission layer 14 and for providing a high-conductivity path. It is to be understood that, within the scope of present field emission element, a plurality of the field emission layers 14 could, in fact, be formed on a given supporting wire 12 (for example, to achieve a material property gradient or to improve durability).

The supporting wire 12 is advantageously made of a material selected from a group consisting of copper, silver, gold, nickel, molybdenum, or other chemically-durable metal materials. Alternatively, the supporting wire 12 can also be made of glass and/or ceramic. The supporting wire 12 is, usefully, thread-shaped, and a diameter thereof is, advantageously, in the approximate range from tens of microns to a few millimeters. It is, however, to be understood that an even smaller diameter (e.g., nano-scale) for the supporting wire 12 could potentially be employed, which could allow for a greater emitter density (i.e., emitters per given area) to be created on a given field emitter device (not shown), while still providing an improved level of emitter support.

The field emission layer 14 may, for example, be a CNT-polymer composite or a CNT-glass composite, and a thickness thereof is usually in the approximate range from 1 micrometer to 1000 micrometers. That said, it is possible for the thickness thereof to be created on the nanometer-scale range, especially for those situations in which a nano-scale supporting wire 12 is employed, e.g., to promote greater emitter density. The CNT-polymer composite includes a polymer matrix and a plurality of carbon nanotubes uniformly dispersed therein. Usefully, the polymer is a material selected from a group consisting of Polyethylene Terephthalate (PET), Polycarbonate (PC), Acrylonitrile-Butadiene Styrene Terpolyer (ABS), and Polycarbonate/Acrylonitrile-Butadiene Styrene Terpolyer (PC/ABS). The percent by mass of the carbon nanotubes in the CNT-polymer composite is in the approximate range from 0.05% to 10%. In one particularly effective embodiment, the percent by mass of the carbon nanotubes in the CNT-polymer composite is about 2%.

The CNT-glass composite includes a glass matrix and has a plurality of carbon nanotubes and conductive metal particles uniformly dispersed therein. The conductive metal particles can, usefully, be silver or indium tin oxide (ITO). Quite advantageously, the conductive metal particles are formed of silver or a silver alloy, and the mass of the silver is about 15 times of that of the glass. If a silver alloy were used, a high-purity (~90 wt %+Ag) alloy would likely be most effective. In an effective embodiment, a length of the carbon nanotubes is in the approximate range from 0.1 micrometer to 20 micrometers, a diameter thereof is in the approximate range from 0.5 nanometer to 100 nanometers, and the percent by mass thereof in the CNT-glass composite is in the approximate range from 0.2% to 10%.

Alternatively, the field emission layer 14 may, for example, be a CNT film manufactured by drawing out a bundle of carbon nanotubes, according to a certain width, from a super-aligned carbon nanotube array. The bundles of the carbon nanotubes are, typically, connected together by Van Der Waals force interactions to form a continuous carbon nanotube film. In a useful embodiment, a diameter of the carbon nanotubes in the carbon nanotube film is in the approximate range from 0.5 nanometer to 100 nanometers, and a thickness of the carbon nanotube film is in the approximate range from 5 nanometer to 10 micrometers. Quite beneficially, the diameter thereof is in the approximate range from 5 nanometers to 40 nanometers.

In use, a single field emission element 10 is fixed (e.g., via a metallurgical bond, such as a solder, or by a conductive adhesive) on/to a conductive cathode electrode (not shown), via the supporting wire 12 thereof, to form a single field emission electron source. Furthermore, a plurality of such field emission elements 10 may be fixed on a conductive cathode electrode, via the respective supporting wires 12 thereof, to form an array of field emission electron sources. Beneficially, the field emission layer 14 of the field emission element 10 has an electrical connection with the conductive cathode electrode. With such a connection, voltage may be applied directly from the conductive cathode electrode to the field emission layer 14. Alternatively, voltage may be applied from the conductive cathode electrode to the field emission layer 14 via the supporting wire 12. It is to be understood that the supporting wire 12 could enhance or, possibly, entirely provide the electrical connection of the field emission layer 14 with the conductive cathode electrode. At a minimum, at least one of the supporting wire 12 and the field emission layer 14 must form an electrical connection with the cathode electrode to ensure operability of the device.

Due to the carbon nanotubes in the field emission layer 14 having good field emission characteristics and the field emission layer 14 being fixed on the conductive cathode electrode by the supporting wire 12, the mechanical connection between the field emission layer 14 and the cathode electrode is firm, and the electrical connection therebetween is sufficient. Thus, the electron emitting performance of the field emission element 10 is improved.

Figure 3:
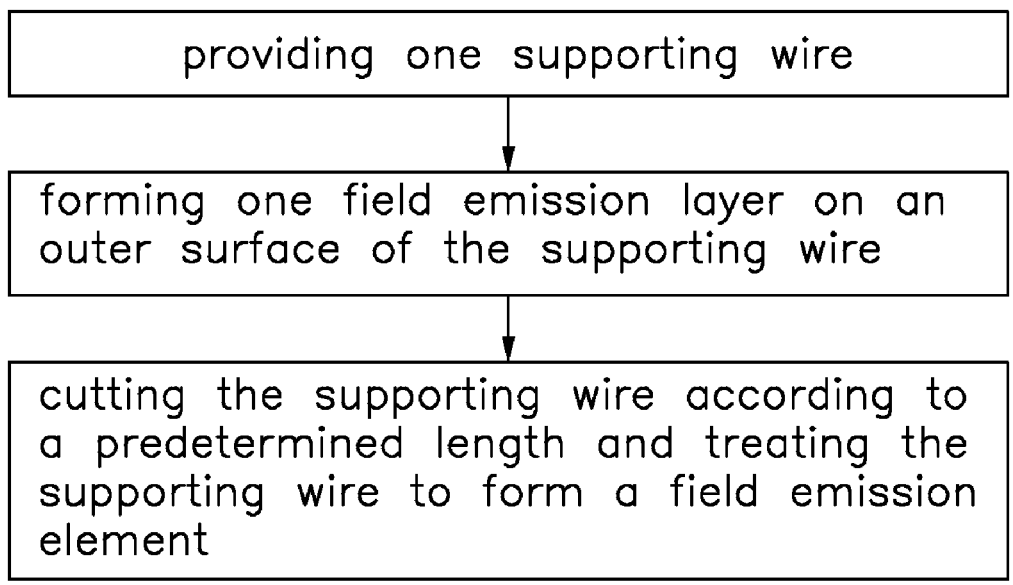
FIG. 3 is a flow chart showing a method for manufacturing the field emission element of FIG. 1.

Referring to FIG. 3, a method for manufacturing the field emission element 10 includes the following steps:

(a): providing one supporting wire 12;

(b): forming at least one field emission layer 14 on an outer surface of the supporting wire 12; and (c): cutting the supporting wire 12, with the at least one field emission layer 14 formed thereon, to a predetermined length and treating the supporting wire 12 to form the field emission element 10.

When a CNT-polymer composite is adopted as the field emission layer 14, the step (b) comprises the following steps:

(b1) adding and dispersing a plurality of carbon nanotubes in a melted polymer;

(b2) applying the nanotube-impregnated polymer on the outer surface of the supporting wire 12; and (b3) cooling the nanotube-impregnated polymer to form the field emission layer 14.

The carbon nanotubes adopted in step (b1) can be obtained by a conventional method such as chemical vapor deposition, arc discharging, or laser ablation. Preferably, the carbon nanotubes are obtained by chemical vapor deposition. In step (b1), the carbon nanotubes are uniformly dispersed in the melted polymer by means of milling.

If a CNT-glass composite is adopted as the field emission layer 14, the step (b) comprises the following steps:

(b1') providing and mixing a plurality of carbon nanotubes, conductive metal particles, organic carriers, and glass powder together to form a composite paste;

(b2') applying the composite paste on the outer surface of the supporting wire; and (b3') drying and sintering the composite paste to form the field emission layer 14.

In step (b1'), the organic carriers is a mixture of terpineol and ethyl cellulose. The mixture is formed at a temperature of about 80° C. by means of a water bath. In the mixture, the terpineol is acted as a solvent, and the ethyl cellulose acts as a stabilizing agent. Furthermore, the percent by mass of the terpineol in the mixture is about 95%, and the percent by mass of the ethyl cellulose in the mixture is about 5%. The carbon nanotubes adopted in step (b1') can be obtained by a conventional method such as chemical vapor deposition, arc discharging, or laser ablation. Preferably, the carbon nanotubes are obtained by chemical vapor deposition.

Advantageously, the percent by mass of the organic carriers in the paste is about 20%, the percent by mass of the conductive metal particles in the paste is about 75%, and the percent by mass of the glass powder in the paste is about 5%. The percent by mass of the carbon nanotubes in the CNT-glass composite is in the approximate range from 0.2% to 10%. In one particularly effective embodiment, the percent by mass of the carbon nanotubes in the CNT-glass composite is about 2%.

In step (b3'), the processes of drying and sintering is performed in the approximate range from 300° C. to 600° C. The process of drying is used to volatilize the organic carriers, and the process of sintering is used to melt the glass powder to bond/adhere the conductive metal particles with the carbon nanotubes.

Alternately, if a CNT film is adopted as the field emission layer 14, the step (b) comprises the following steps:

(b1") selecting and drawing out a bundle of carbon nanotubes from a CNT array to form the CNT film;

(b2") wrapping the CNT film around the outer surface of the supporting wire 12; and (b3") immersing the supporting wire 12 in an organic solvent to form the field emission layer 14.

Step (b1") is executed as follows. Firstly, a super-aligned carbon nanotube array is provided. Secondly, a bundle of the carbon nanotubes according to a certain width is selected and drawn out from the super-aligned carbon nanotube array using forceps or another gripping/pulling means, to form the carbon nanotube film along the drawn direction. The bundles of the carbon nanotubes are connected together by Van Der Waals force interactions to form a continuous carbon nanotube film.

It is to be noted that not all carbon nanotube arrays can be used to create the carbon nanotube films. The carbon nanotube films can only be drawn out from the super-aligned carbon nanotube arrays. Based on extensive experimentation on the growth mechanisms of carbon nanotubes, the crucial factors for growing the super-aligned carbon nanotube array suitable for production of the films are listed below:

i) the substrate for growing the carbon nanotube array should be substantially flat and smooth;

ii) the growth rate of the carbon nanotube array should be relatively high; and iii) the partial pressure of the carbon containing gas should be relatively low.

In general, a width and thickness of the carbon nanotube film can be controlled by a size of a tip of the tool that is used to pull out the film. The smaller the tip is, the smaller the film width and thickness is. A length of the carbon nanotube film depends on an area of the super-aligned carbon nanotube array. A force used to pull out the film depends on the width and thickness of the carbon nanotube film. The bigger the width and thickness of the carbon nanotube film is, the bigger the force is. Preferably, the thickness of the carbon nanotube film is in the approximate range from about 5 nanometers to 10 micrometers.

In step (b2"), a single layer or multiple layers of the CNT film can be wrapped around the outer surface of the supporting wire 12 to enclose the outer surface of the entire supporting wire 12. In step (b3"), the process of immersing the supporting wire 12 in the organic solvent can ensure the CNT film attaches firmly on/to the outer surface of the supporting wire 12. Advantageously, the organic solvent is ethanol.

The field emission element 10 can be made directly according to the actual length needed. Alternatively, the field emission element 10 can be made relatively long and then be cut according to the actual length needed by means of, e.g., mechanical cutting or laser cutting. Furthermore, a surface treating process can be executed to the field emission element 10. The surface treating process can, for example, be a laser irradiating process and/or a mechanical rubbing process. This surface treating process can ensure at least part of or even all of the carbon nanotubes dispersed in the polymer or glass open to the ambient at and/or proximate at least one end thereof. This exposure to ambient can enhance the field emission performance of the carbon nanotubes. Furthermore, a large-current field emission aging process can be executed to the field emission element 10 to further enhance the field emission performance of the carbon nanotubes.

Compared with the conventional field emission element, the field emission element 10 of the present embodiment has the following virtues. Firstly, a field emission layer 14 of the field emission element 10 adopts carbon nanotubes, and the carbon nanotubes have excellent field emission performance inherently. Thus, the field emission element 10 has a relatively excellent field emission performance Secondly, the supporting wire 12 can support and secure the field emission layer 14. This support ensures that the field emission element 10 has excellent mechanical characteristics. Thus, the field emission element 10 can be made easily and used conveniently in field emission devices.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A method for manufacturing a field emission element, the method comprising the steps of:
   (a) providing one supporting wire;
   (b) forming at least one field emission layer on an outer surface of the supporting wire; and
   (c) cutting the supporting wire, upon forming the at least one field emission layer thereon, to a predetermined length to form the field emission element;
   wherein the field emission layer is a CNT-polymer composite, the step (b) comprises the following steps:
   (b1') adding and dispersing a plurality of carbon nanotubes in a melted polymer;
   (b2') applying the polymer, with the carbon nanotubes dispersed therein, on the outer surface of the supporting wire; and
   (b3') cooling the applied polymer to form the field emission layer.

2. The method as claimed in claim 1, wherein in step (c), the cutting process comprises a mechanical cutting process or a laser cutting process.

3. The method as claimed in claim 1, wherein, after at least one field emission layer is formed on the supporting wire, a treating process is performed on the at least one field submission layer, the treating process comprising at least one of a laser irradiating process, a mechanical rubbing process, and a large-current field emission aging process.

4. A method for manufacturing a field emission element, the method comprising the steps of:
   (a) providing one supporting wire;
   (b) forming at least one field emission layer on an outer surface of the supporting wire; and
   (c) cutting the supporting wire, upon forming the at least one field emission layer thereon, to a predetermined length to form the field emission element;
   wherein the field emission layer
   a CNT-glass composite, the step (b) comprises the following steps:
   (b1") providing and mixing a plurality of carbon nanotubes, conductive metal particles, organic carriers, and glass powder to form a paste;
   (b2") applying the paste on the outer surface of the supporting wire; and
   (b3") at least drying and sintering the paste to form the field emission layer.

5. The method as claimed in claim 4, wherein in step (c), the cutting process comprises a mechanical cutting process or a laser cutting process.

6. The method as claimed in claim 4, wherein after at least one field emission layer is formed on the supporting wire, a treating process is performed on the at least one field submission layer, the treating process comprising at least one of a laser irradiating process, a mechanical rubbing process, and a large-current field emission aging process.

* * * * *